United States Patent [19]

Arimune et al.

[11] Patent Number: 4,995,024
[45] Date of Patent: Feb. 19, 1991

[54] MAGNETO-OPTICAL RECORDING ELEMENT

[75] Inventors: Hisao Arimune; Takashi Maeda; Mitsuo Miyazaki; Yasuo Nishiguchi, all of Hayato, Japan

[73] Assignee: Kyocera Corporation, Kyoto, Japan

[21] Appl. No.: 264,159

[22] Filed: Oct. 28, 1988

[30] Foreign Application Priority Data

Oct. 30, 1987 [JP] Japan .................................. 62-276733

[51] Int. Cl.$^5$ ...................... G11B 13/04; G11B 11/10; G11B 11/12
[52] U.S. Cl. ....................................... 369/13; 428/694; 428/900; 365/122; 360/131
[58] Field of Search ..................... 369/13; 360/59, 131, 360/114; 365/122; 428/694, 900

[56] References Cited

U.S. PATENT DOCUMENTS

| 4,544,443 | 10/1985 | Ohta et al. | 156/643 |
| 4,544,602 | 10/1985 | Kobayashi et al. | 365/122 |
| 4,610,912 | 9/1986 | Takahashi et al. | 428/694 |
| 4,780,377 | 10/1988 | Takano | 428/694 |

FOREIGN PATENT DOCUMENTS 60-35335 2/1985 Japan .

OTHER PUBLICATIONS

Kobayashi et al., "MAG. Process of Exchange-Coupled Ferrimagnetic Double Layered Filmes", TP Journal of Applied Physics, vol. 20, No. 11, Nov. 1981, pp. 2089-2095.

Primary Examiner—Stuart S. Levy
Assistant Examiner—Hoa T. Nguyen
Attorney, Agent, or Firm—Spensley Horn, Jubas & Lubitz

[57] ABSTRACT

Disclosed is a magneto-optical recording element comprising a dielectric layer and an amorphous perpendicular magnetization film on a substrate, wherein the perpendicular magnetization film is a perpendicular magnetization film comprising at least Gd element as the rare earth metal element and Fe metal as the transition metal component, in which the Fe sub-lattice moments are dominant, the dielectric layer is a dielectric layer composed of amorphous silicon nitride, the magnetization Ms of the perpendicular magnetization film is set within a range represented by the following formula (1):

$$20 \text{ emu/cc} \leq Ms \leq 70 \text{ emu/cc} \tag{1}$$

and the product of the magnetization Ms and the coercive force Hc is set within a range represented by the following formula (2):

$$100 \text{ emu·KOe/cc} \leq Ms·Hc \leq 500 \text{ emu·KOe/cc} \tag{2}$$

This magneto-optical recording material is suitable for the magnetic field modulation recording method, and even if overwriting is carried out in the recording method, the element shows excellent characteristics and high performances.

12 Claims, 4 Drawing Sheets

MAGNETO-OPTICAL RECORDING ELEMENT

BACKGROUND OF THE INVENTION (1) Field of the Invention

The present invention relates to a magneto-optical recording element. More particularly, the present invention relates to a magneto-optical recording element which is suitable for the magnetic field modulation recording method and makes overwriting possible.

(2) Description of the Prior Art

Magneto-optical recording using an amorphous metal alloy comprising a rare earth metal element and a transition metal element has been vigorously studied. According to this recording method, convergent laser beams are projected on a recording medium to effect local heating and writing of bits and the bits are read out by utilizing the magnetic-optical effect. Furthermore, the recorded bits can be erased and new bits can be written again.

In the case where rewriting is performed according to the light power modulation method, recording and erasure should be separately carried out, and hence, a magneto-optical disk should be turned at least two times. Accordingly, real-time rewriting is impossible.

Use of the magnetic field modulation recording method for rewriting instead of this light power modulation recording method has been proposed. According to this method, overwriting is possible, but it is necessary to use a magnetic head capable of high-speed switching under application of a large bias magnetic field. Since this magnetic head has a large driving current and a large reactance, fabrication of this magnetic head is difficult.

In this magnetic field modulation recording method, a magnetic material in which recording can be performed by a small external magnetic field is desired, and recently, a TbFeCo magnetic alloy in which the rare earth element-sub-lattice moments are dominant at room temperature and which has the compensation temperature between the Curie temperature and room temperature has been proposed as the material satisfying this desire. It is reported that if this magnetic alloy is used, recording is possible at about ± 200 Oe.

In U.S. Pat. No. 4,751,142, we proposed use of a perpendicular magnetization film composed of an alloy having a composition represented by the formula $(Gd_y Dy_{1-y})_x Fe_{1-x}$ in which $X$ is a number of from 0.15 to 0.35 and y is a number of from 0.30 to 0.95. Furthermore, U.S. Pat. No. 4,680,742 teaches that a deposition layer of a composition comprising $Si_3N_4$ and a refractive indeximproving agent such as $Al_2O_3$ or $Y_2O_3$ is used as the dielectric layer of a magneto-optical recording element.

However, a relative large bias magnetic field is necessary for the known magneto-optical recording elements, and development of an element capable of recording at a magnetic field intensity lower than ± 200 Oe, especially lower than ± 150 Oe, is desired.

SUMMARY OF THE INVENTION

It is therefore a primary object of the present invention to provide a magneto-optical recording element capable of recording by a low bias magnetic field.

Another object of the present invention is to provide a magneto-optical recording element which is advantageously applied to the magnetic modulation recording by a low external magnetic field modulation, whereby overwriting is made possible.

Still another object of the present invention is to provide a magneto-optical recording element in which the product of the magnetization Ms and the coercive force Hc is within a novel certain range.

More specifically, in accordance with an embodiment of the present invention, there is provided a magneto-optical recording element comprising a dielectric layer and an amorphous perpendicular magnetization film on a substrate, wherein the perpendicular magnetization film is a perpendicular magnetization film comprising at least Gd element as the rare earth metal element and Fe metal as the transition metal component, in which the Fe sub-lattice moments are dominant, the dielectric layer is a dielectric layer composed of amorphous silicon nitride, the magnetization Ms of the perpendicular magnetization film is set within a range represented by the following formula (1):

$$20 \text{ emu/cc} \leq Ms \leq 70 \text{ emu/cc} \tag{1}$$

and the product of the magnetization Ms and the coercive force Hc is set within a range represented by the following formula (2):

$$100 \text{ emu·KOe/cc} \leq Ms \cdot \leq 500 \text{ emu·KOe/cc} \tag{2}$$

Figure 1:
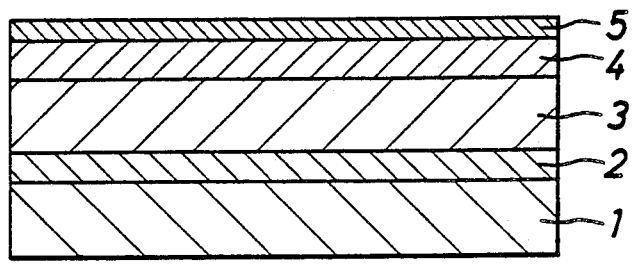
FIG. 1 is a sectional view illustrating the layer structure of the magneto-optical recording element according to an embodiment of the present invention.

In the drawings, reference numerals 1, 2, 3, 4 and 5 represent a substrate, a silicon nitride dielectric layer, a magnetic material layer, a protecting layer and a covering resin layer, respectively.

DETAILED DESCRIPTION OF THE PREFERRED EMBODIMENTS

The magneto-optical recording element according to an embodiment of the present invention is characterized in that (i) a perpendicular magnetization film comprising at least Gd element as the rare earth metal component and Fe metal as the transition metal component, in which the Fe sublattice moments are dominant, is used, (ii) a dielectric layer composed of amorphous silicon nitride is used as the dielectric layer, and (iii) the magnetization Ms of the perpendicular magnetization film and the product of the magnetization Ms and the coercive force Hc are set within ranges satisfying the requirements represented by the formulae (1) and (2) described above.

Incidentally, the magnetic composition, magnetization Ms and coercive force Hc referred to in the instant specification and appended claims are those as determined at 20° C.

In an alloy magnetic film comprising a rare earth metal and a transition metal, there is a specific ratio (compensation composition) of both the metals, at which the magnetization Ms is zero, and a region where the transition metal sub-lattice moments are dominant is present on one side of this compensation composition and a region where the rare earth metal sub-lattice moments are dominant is present on the other side of the compensation composition.

The reason why Fe is selected as the transition metal component in the present invention is that Fe gives a higher squareness in the hysteresis loop at a high temperature than Co or the like. The reason why at least Gd element is used as the rare earth metal component in the present invention is that the Curie point of the alloy is controlled within a practical range (at least 160° C.). In the present invention, it is important that the alloy composition should be adjusted so that the Fe sub-lattice moments are dominant, whereby it is made possible to perform recording in a low bias magnetic field. The reason is considered to be as follows.

As the composition deviates from the point of the compensation composition, the magnetization Ms tends to increase and the coercive force Hc tends to decrease. In the region where the rare earth metal sub-lattice moments are dominant, recorded bits are small and unstable in the vicinity of the point of the compensation composition and therefore, a composition remote from the compensation composition has to be used and a high bias magnetic field should accordingly be used. In contrast, in the region where the transition metal (Fe) sub-lattice moments are dominant, even in the vicinity of the point of the compensation composition, bits are large and stable, and recording is possible even at a low bias magnetic field.

In the present invention, amorphous silicon nitride is used for the dielectric layer. The reasons are as follows.

Amorphous silicon nitride has a relatively large refractive index and a large enhancement of the Kerr rotation angle, and the barrier property to oxygen or water is large and amorphous silicon nitride reduces the coercive force Hc of the perpendicular magnetization film formed on the layer of amorphous silicon nitride, whereby the value of Hc x Ms can be easily controlled within the narrow range specified by the above-mentioned formula (2).

In the recording element according to the present invention, it is important that the magnetization Ms should be within the range represented by the above-mentioned formula (1) and the product of the magnetization Ms and the coercive force Hc should be within the range represented by the above-mentioned formula (2).

In the magnetic field modulation recording method, overwriting is accomplished by applying a magnetic field so that the moments is reversed to a direction opposite to the magnetization direction of the already recorded bits or by applying a magnetic field in the same direction as the magnetization direction of the already recorded bits. The magnetization field applied in the former case is called "recording reversal magnetic field" and the magnetic field applied in the latter case is called "recording retention magnetic field".

If the recording reversal magnetic field is applied, a leakage magnetic field is formed in the same direction as that of the applied magnetic field and a dimagnetizing field is produced in the bits. Accordingly, in order to reduce the recording reversal magnetic field, ti is necessary to increase the leakage magnetic field and the dimagnetizing field, and in order to satisfy this requirement, the magnetization Ms of the magnetic material layer should be increased.

On the other hand, in the case where the recording retention magnetic field is applied, a leakage magnetic field is formed in a direction opposite to the direction of the applied magnetic field and a dimagnetizing field is produced in the bits. Accordingly, in order to reduce the recording retention magnetic field, the leakage magnetic field and the dimagnetizing field should be reduced, and in order to satisfy this requirement, the magnetization Ms of the magnetic material layer should be reduced.

As is apparent from the foregoing description, in case of reversion of recording and in case of retention of recording, contradictory requirements should be satisfied in connection with the magnetization Ms.

We found that if the magnetization Ms is set within a specific range and the product of the magnetization Ms and the coercive force Hc is set at a predetermined level, by utilizing the fact that the coercive force Hc of the magnetic material layer is greatly influenced by the kind of the underlayer (dielectric layer) and the surface conditions (shape and/or compressive force) (this influence is known as the growth-induced magnetic anisotropy or stress-induced anisotropy), both of the applied magnetic fields can be reduced and the bits can be retained or reversed, as required.

More specifically, we found that if the product of the magnetization Ms and coercive force Hc of the magnetic material layer is reduced, at the place where the recording retention magnetic field is applied and convergent laser beams are projected, a reversal magnetic domain is going to break out as a minute bud, but during the cooling step, the bud disappears if the bud is smaller than the bit diameter where the reversal magnetic domain is stably present, with the result that the magnetization direction is stably present in the direction of the application of the recording retention magnetic field. Furthermore, we found that in the case where the magnetization is set within a predetermined range, the threshold value of the recording reversal magnetic field is reduced and the signal quality expressed by the jitter quantity is improved. Incidentally, the above-mentioned bit diameter is generally defined by the stably present bit diameter $d \simeq 5w/(2Ms \cdot Hc) \propto 1/Ms \cdot Hc$ (in which $\delta w$ is a domain wall energy, which is a physical quantity unitarily determined by the material of the magnetic material layer).

The product Ms Hc of the magnetization and the coercive force is set within the range of 100 emu·KOe/cc$\leq$Ms·Hc$\leq$500 emu·KOe/cc, preferably 150 emu·KOe/cc$\leq$Ms·Hc$\leq$400 emu·KOe/cc. If this product is smaller than 100 emu KOe/cc, the jitter quantity is large and the C/N ratio is reduced, and reversal of the magnetization by the reversal of the polarity of the magnetic field is not caused and design of the magnetic head becomes complicated. If the product Ms·Hc exceeds 500 emu·KOe/cc, the threshold value of the recording retention magnetic field exceeds − 100 Oe.

The magnetization Ms is set within the range of 20 emu/cc$\leq$Ms$\leq$70 emu/cc, preferably 30 emu/cc$\leq$Ms$\leq$55 emu/cc. If Ms is smaller than 20 emu/cc, the threshold value of the recording reversal magnetic field exceeds 150, and if Ms exceeds 70 emu/cc, the threshold value of the recording retention magnetic field increases and the coercive force becomes too small, and moreover, the jitter quantity increases (becomes bad).

Incidentally, the threshold value of the recording reversal magnetic field or recording retention magnetic field has sometimes a deviation of about ± 30 Oe according to the recording-reproduction apparatus by the amplitude of the noise of the apparatus or the error of the measurement of the intensity of the magnetic field.

In order to reduce the coercive force Hc of the magnetic material layer and satisfy the requirement of the formula (2) while maintaining Ms within the range represented by the formula (1), it is preferred that a silicon nitride dielectric layer having a compression stress of $5 \times 10^9$ to $10 \times 10^9$ dyne/cm$^2$ be used as the silicon nitride dielectric layer, though effective means is not limited to use of this silicon nitride dielectric layer. As another effective means, there can be adopted a method in which Si$_3$N$_4$ target is sputtered at an angle deviating from the right angle to the substrate so that the incident angle to the substrate is 30° to 70°.

The magneto-optical recording element comprising the above-mentioned silicon nitride dielectric layer and magnetic material layer has typically a layer structure shown in FIG. 1.

Referring to FIG. 1, a magnetic material layer 3 is formed on a substrate 1 through a silicon nitride dielectric layer 2; and a protecting layer 4 is formed on the magnetic material layer 4 and a covering resin layer 5 is formed on the protecting layer 4.

In the manetic material layer 3, a perpendicular magnetization film is formed by the combination of a rare earth metal element and a transition metal element. Gd is indispensable as the rare earth metal element and an element such as Tb, Dy, Nd, Sm or Ho may be added to Gd. Fe is the main component of the transition metal element. When this combination is adopted, the squareness in the hysteresis loop at high temperatures is improved and the influence of the dielectric layer 2 is easily susceptive. As the alloy of this type, there can be mentioned GdDyFe, GdTbFe, GdTbDyFe, NdGdTbFe, NdGdDyFe and NdGdTbDyFe.

A magnetic material layer having a composition represented by the formula $(Gd_yDy_{1-y})_xFe_{1-x}$ in which y is a number of from 0.30 to 0.95, especially from 0.40 to 0.80, and x is a number of from 0.17 to 0.25, especially from 0.19 to 0.23, is especially preferred.

It is preferred that the thickness of the magnetic material layer 3 be adjusted to 300 to 1000 Å, whereby the threshold value of each of the recording reversal magnetic field and the recording retention magnetic field can be controlled to a smallest value.

The magnetic material layer can be formed according to known film-forming means such as the sputtering method, the vacuum deposition method, the ion plating method, the ion injection method or the plating method. Incidentally, although the magnetic material comprises the rare earth metal and Fe metal, inclusion of a component other than the above two components is not excluded. For example, unavoidable inclusion of other element, such as oxygen or carbon, in the above-mentioned film-forming method is permissible.

The silicon nitride dielectric layer 2 can be prepared according to the sputtering method using silicon nitride as the target. Argon gas is used as the sputtering gas, and a silicon nitride dielectric layer having a desired compression stress or shape can be obtained by adjusting the gas pressure.

We found that a certain relation is established between the compression stress of the silicon nitride dielectric layer and the coercive force of the magnetic material layer, but the casual sequence of this finding has not been clarified. However, by repeating the experiments, we confirmed that in the case where a silicon nitride dielectric layer is formed by the above-mentioned sputtering method, in order to reduce the coercive force of the magnetic layer, it is preferred that the argon gas pressure be set at a level lower than 3 mTorr, and the compression stress is changed under this condition. We consider that the surface condition of this layer is simultaneously changed. Accordingly, it is considered that the incident angle of the sputtered particles to the substrate surface and the kinetic energy of the sputtered particles have influences on reduction of the coercive force of the magnetic material layer, and hence, the coercive force of the magnetic material layer can be changed by adjusting the incident angle distribution of the sputtered particles.

It also was confirmed that in the case where a silicon nitride dielectric layer is formed according to the above-mentioned sputtering method, this layer is rendered amorphous.

In forming the above-mentioned silicon nitride dielectric layer, an atom other than silicon nitride may be incorporated into the above-mentioned target and this heterogeneous atom may be included into the film. As the additive component, there can be mentioned elements of group IIIa of the periodic table such as Y, La and Ce, elements of group IVa of the periodic table such as Ti and Zr, elements of group VIa of the periodic table such as Cr and Mo, elements of group Vb of the periodic table such as Sb and Bi, elements of group IVb of the periodic table such as Si, Ge, Sn and Pb, elements of group IIIb of the periodic table such as B and Al, elements of group IIb of the periodic table such as Zn and Cd, and oxides, nitrides, sulfides and silicides of these elements. This heterogeneous atom is added in such an amount that the amorphous state is substantially maintained in the dielectric layer.

The protecting layer 4 is composed of at least one member selected from anti-corrosive metals such as Ti, Cr, Zr, Ta and Al, nitrides of Si, Al and Ti, carbides of Si, Cd and Ti, sulfides of Zn and Cd, fluorides of Mg and oxides of Al, Ce, Zr, Si, Cd and Bi.

The covering resin layer 5 is composed of an epoxy resin, a polyester resin, an acrylic resin or an acrylic urethane resin.

A glass sheet or a plastic plate is used as the substrate 1. As the material of the plastic substrate, there can be mentioned a polycarbonate resin, an epoxy resin, a polyester resin and an acrylic resin.

The present invention will now be described in detail with reference to the following examples that by no means limit the scope of the invention.

EXAMPLE 1

In a substrate-rotating type high-frequency three-source magnetron sputtering apparatus having target-setting points (5 inches in diameter) located rotationally symmetrically at an angle of 120° with respect to the center of a substrate holder, targets composed of an Si$_3$N$_4$ ceramic sintered body (containing Al$_2$O$_3$ and Y$_2$O$_3$ as sintering aids) were arranged, and a disk-shaped substrate composed of a polycarbonate was set at a position 120 mm apart from the targets. Evacuation was sufficiently conducted to $5\times10^{-7}$ Torr, and Ar gas (having a purity of 99.999%) was introduced at a flow rate of 33 sccm. An electric power of 100 W was applied to the substrate while setting the rotation speed of the substrate holder at 60 rpm, to effect the bombardment treatment. Then, pre-sputtering was carried out for 5 minutes under an applied power 1 kW and an argon pressure shown in Table 1. Subsequently, a silicon nitride layer having a thickness of 750 Å was formed by sputtering. Thus, three kinds of silicon nitride layers different in the compression stress according to the argon gas pressure were formed. Then, Gd chips and Dy chips were arranged on Fe targets and GdDyFe magnetic material layers [having a transition metal sub-lattice moments-dominant composition of $(Gd_{0.6}Dy_{0.4})_x Fe_{1-x}$; $0.17 \leq x \leq 0.25$] having a thickness of 400 Å were formed on the respective silicon nitride layers by sputtering. In the same apparatus, on each silicon nitride layer, a protecting layer 4 (composed of titanium oxide; the ratio of the oxygen atom to the titanium atom was set within the range of from 0.05 to 0.90) was formed in a thickness of 650 Å. Then, an ultra-violet ray-curable resin was formed in a thickness of 3 to 6 μm on the protecting layer 4. Thus, three magneto-optical recording elements having a structure as shown in FIG. 1 were prepared.

The relation between the argon gas pressure and the compression stress of the silicon nitride in the so-obtained elements is shown in Table 1. The compression stress was determined by using a glass sheet (having a thickness of 75 μm) instead of the polycarbonate substrate, forming a silicon nitride layer in the same manner as described above and measuring the thickness of the silicon nitride layer and the warp of the sheet.

TABLE 1

| Element | Ar Gas Pressure (mTorr) | Compression Stress (dyn/cm²) |
|---|---|---|
| A | 4.0 | $4 \times 10^9$ |
| B | 2.5 | $6 \times 10^9$ |
| C | 1.25 | $9 \times 10^9$ |

Figure 2:
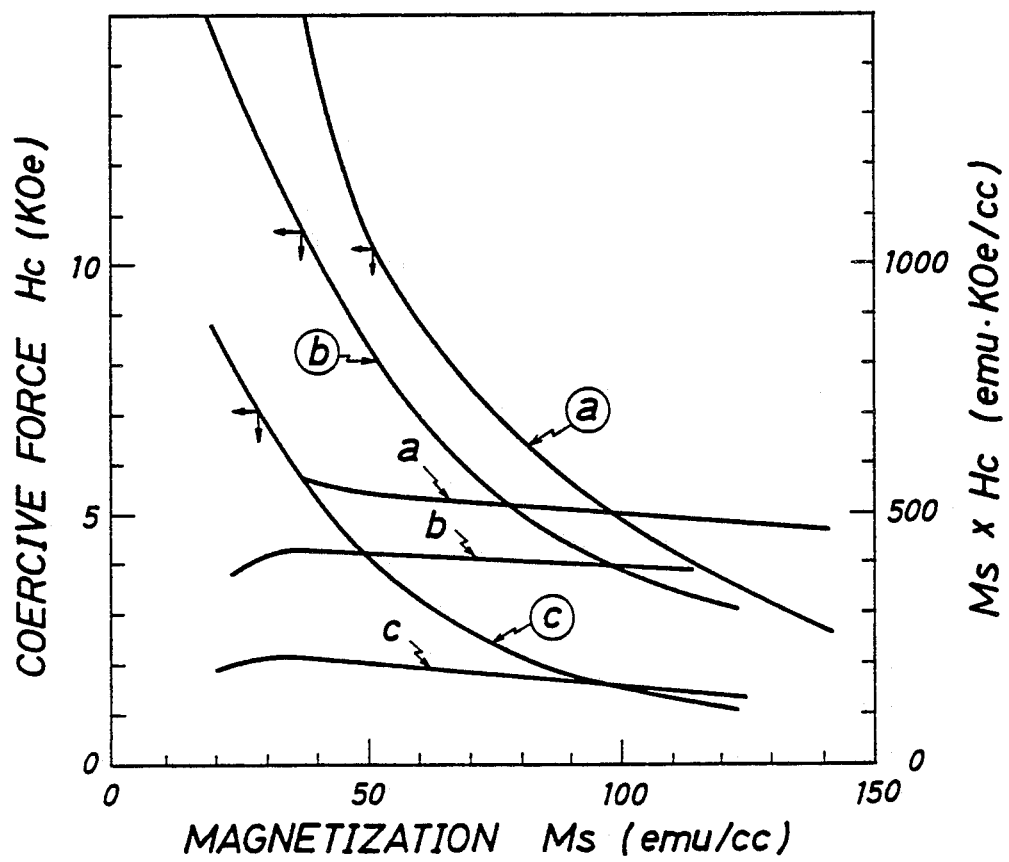
FIG. 2 is a graph illustrating the relation between the magnetization Ms and the coercive force Hc and the relation between the magnetization Ms and the product of the magnetization Ms and the coercive force Hc.

With respect to each of the foregoing elements A, B and C, samples differing in the magnetization Ms were formed by changing the above-mentioned value x and the coercive force Hc was measured, and the product $Ms \times Hc$ was determined. The obtained results are shown in FIG. 2. Incidentally, the measurement was conducted at a position apart by a radius of 55 mm from the rotation center of the substrate holder, and at this position, the film was formed by particles sputtered obliquely at an angle of about 30° to about 70° to the substrate surface.

In FIG. 2, the magnetization Ms is plotted on the abscissa, the coercive force Hc is plotted on the left ordinate and $Mx \times Hc$ is plotted on the right ordinate. Curves (a), (b) and (c) are curves of the coercive force characteristic and curves a, b and c are curves of the $Ms \times Hc$ characteristic.

As is apparent from FIG. 2, the coercive force Hc tends to decrease with increase of the compression stress of the silicon nitride layer, even if the composition of the magnetic material layer and the magnetization Ms are the same, and therefore, the value of $Ms \times Hc$ tends to decrease with increase of the compression stress.

EXAMPLE 2

Figure 3:
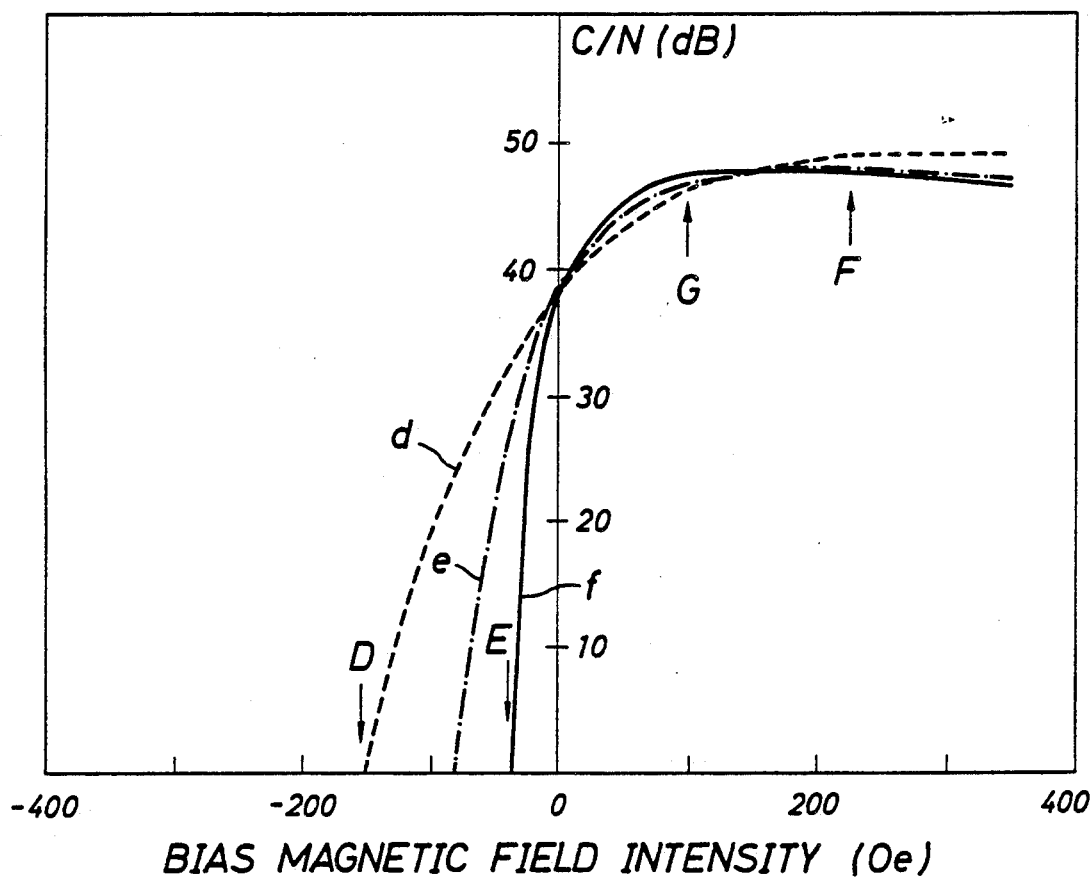
FIG. 3 is a graph illustrating the relation between the bias magnetic field and C/N.

A bias magnetic field was applied to each of the magneto-optical recording elements A, B and C (a polycarbonate substrate having a diameter of 130 mm was used and the magnetization Ms was set at about 45 emu), and C/N was measured by the light power modulation recording method by changing the intensity of the bias magnetic field. The obtained results are shown in FIG. 3. Incidentally, C/N was measured under conditions of a radius of 55 mm, a rotation number of 1200 rpm. a recording frequency of 2.7 MHz, a recording power of 5.5 mW and a reading power of 1.5 mW.

In FIG. 3, curves d, e and f are curves of the bias magnetic field dependency of C/N in the elements A, B and C. D and E indicate the threshold values of the recording retention magnetic fields of the elements A and C, and F and G indicate the threshold values of the recording reversal magnetic fields of the elements A and C.

As is apparent from FIG. 3, the element C having a large compression stress had smaller threshold values of the recording retention magnetic field and recording reversal magnetic field than those of the element A. The bias magnetic field dependency represented by D and E suggests that a mechanism of nipping the bud of the reversal magnetic domain exists.

EXAMPLE 3

Various elements differing in $Ms \times Hc$ were prepared by changing the compression stress of the silicon nitride layer and the magnetization Ms in the elements used in Example 2, and the threshold value of the recording retention magnetic field and recording reversal magnetic field of each element were measured. Small pieces were cut out from the disk plates of the respective elements, and the magnetization Ms and coercive force Hc were measured with respect to each small piece. The relation between $Ms \times Hc$ and the threshold value of the recording retention magnetic field in the disk where the threshold of the recording reversal magnetic field was + 100 to + 150 Oe was plotted (indicated by marks ◉ in FIG. 4).

Figure 4:
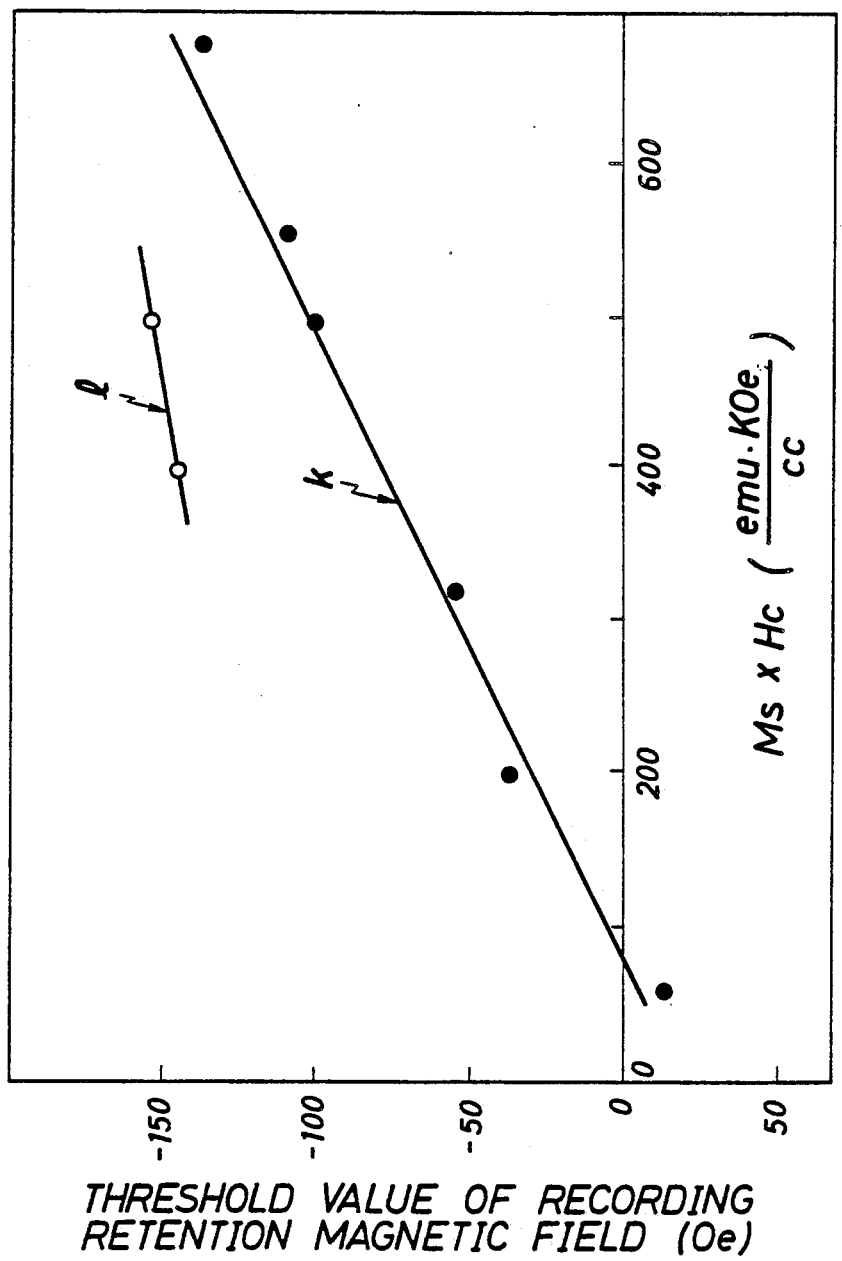
FIG. 4 is a graph illustrating the relation between the product of the magnetization Ms and the coercive force Hc and the threshold value of the recording retention magnetic field.

Separately, magneto-optical recording elements were prepared in the same manner as described above except that a ZnS layer was formed instead of the silicon nitride layer, and the relation between the recording retention magnetic field and $Ms \times Hc$ was plotted (indicated by marks ● in FIG. 4).

Incidentally, k and l in FIG. 4 are curves indicating the characteristics of the element having the silicon nitride layer and the element having the ZnS layer, respectively.

As is apparent from FIG. 4, in an element having a silicon nitride layer, the threshold value of the recording retention magnetic field is smaller than in an element having a ZnS layer, and in the case where Ms x Hc is smaller than 500 emu·KOe/cc, the threshold value of the recording retention magnetic field is smaller than 100 Oe and the element is suitable for the magnetic field modulation recording.

In the case where Ms x Hc is smaller than 100 emu·KOe/cc, the recording retention magnetic field is changed from zero to a positive value, and this phenomenon cannot be explained only by relying on the leakage magnetic field but it is suggested that the above-mentioned mechanism of erasing bits exists.

When the atomic structure of the above-mentioned silicon nitride layer was analyzed by the X-ray diffractometry, any peak of the crystal was not detected in any silicon layer but the halo pattern was detected. Accordingly, it was confirmed that the silicon nitride layer was rendered amorphous. When the ZnS layer was similarly analyzed, it was confirmed that the ZnS layer had a uniaxial directionality.

EXAMPLE 4

Figure 5:
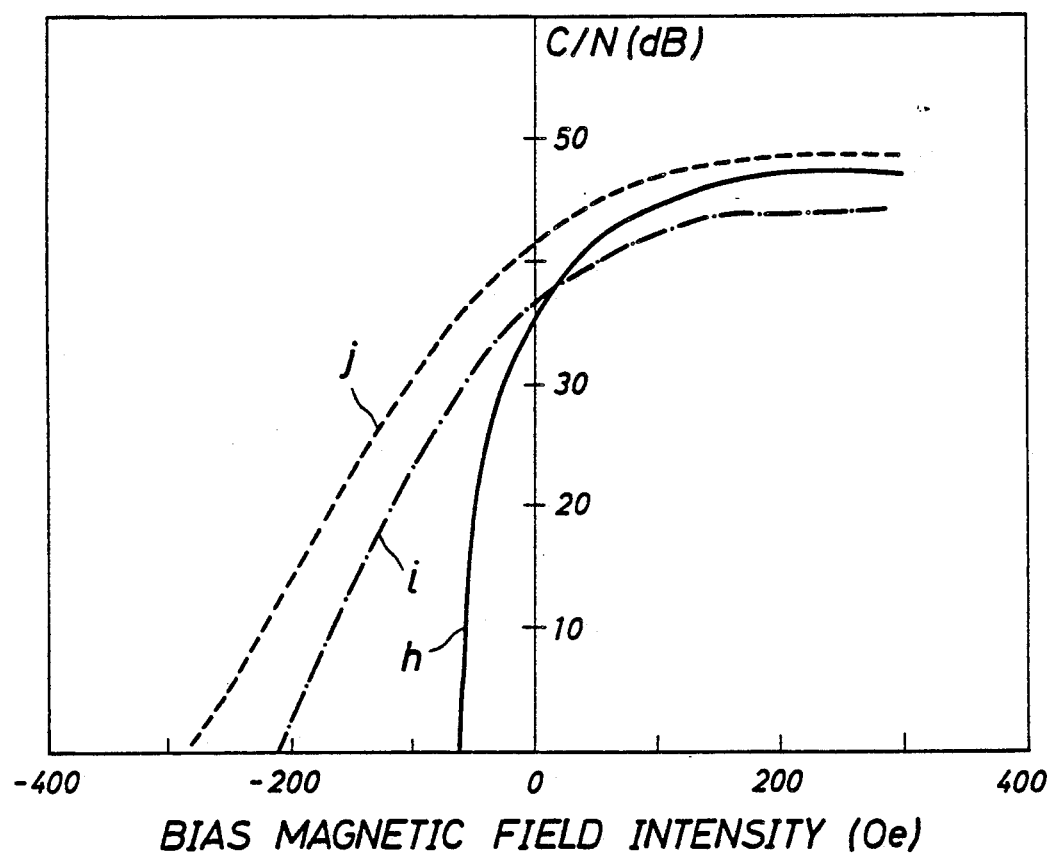
FIG. 5 is a graph illustrating the relation between the bias magnetic field and C/N.

Elements H, I and J were prepared in the same manner as adopted for the preparation of element C in Example 2 except that the material of the magnetic material was changed as indicated in Table 2. A bias magnetic field was applied to each element and C/N was measured while the intensity of the magnetic field was changed. The obtained results are shown in FIG. 5. In each magnetic material layer, a transition metal-sublattice moments-dominant composition close to the compensation composition was adopted.

TABLE 2

| Element | Magnetic Material Layer | Characteristic Curve in FIG. 5 | Magnetization Ms (emu/cc) | Ms × Hc (emu KOe/cc) |
|---|---|---|---|---|
| H | (GdTb)Fe | h | 50 | 350 |
| I | Dy(FeCo) | i | 58 | 880 |
| J | TbFe | j | 42 | 650 |

As is apparent from FIG. 5, the recording retention magnetic field of element H was as small as that of element C.

In contrast, the recording retention magnetic fields of elements I and J were large and exceeded -200 Oe. The reason is considered to be that even if the compression stress is increased, the absolute value of Ms × Hc is large and the temperature dependency of the magnetization Ms is different from that of Hc.

EXAMPLE 5

Overwriting was carried out under conditions described below by using element C.
Radius: 55 mm
Rotation number: 1200 rpm
Recording frequency: 0.6 MHz
Recording power: 5.5 mW
Reproduction power: 1.5 mW At the light modulation recording, C/N was 46 dB, and at the magnetic field modulation recording at a modulation magnetic field intensity of ±100 Oe, C/N was 45 dB and was as good as C/N at the light power modulation recording.

As is apparent from the foregoing description, the magneto-optical recording material according to the present invention is suitable for the magnetic field modulation recording method, and even if overwriting is carried out in this recording method, the element shows excellent characteristics and high performances.

We claim:

1. A magneto-optical recording element operable with at least one of an applied recording retention magnetic field and an applied recording reversal magnetic field, the recording element comprising a dielectric layer and an amorphous perpendicular magnetization film on a substrate, wherein the perpendicular magnetization film is a perpendicular magnetization film comprising at least Gd element as the rare earth metal element and Fe metal as the transition metal component, in which the Fe sub-lattice moments are dominant, the dielectric layer is a dielectric layer composed of amorphous silicon nitride, the perpendicular magnetization film has a magnetization Ms and a coercive force Hc such that the magnetization Ms is within a range represented by the following formula:

$$20 \text{ emu/cc} \leq Ms \leq 70 \text{ emu/cc}$$

and the product of the magnetization Ms and the coercive force Hc is set within a range represented by the following formula:

$$100 \text{ emu·KOe/cc} \leq Ms·Hc \leq 500 \text{ emu·KOe/cc}$$

and wherein said recording element has an ability to overwrite at a recording retention magnetic field having an absolute value smaller than 150 Oe and a recording reversal magnetic field having an absolute value smaller than 150 Oe.

2. A recording element as set forth in claim 1, wherein the magnetization Ms of the perpendicular magnetization film is set within a range of from 30 emu/cc to 55 emu/cc.

3. A recording element as set forth in claim 1, wherein the product of the magnetization Ms of the perpendicular magnetization film and the coercive force Hc is set within a range of from 150 emu·KOe/cc to 400 emu·KOe/cc.

4. A recording element as set forth in claim 1, wherein the perpendicular magnetization film is composed of a magnetic alloy comprising (i) Gd, (ii) at least one element selected from the group consisting of Tb, Dy, Nd, Sm and Ho and (iii) Fe.

5. A recording element as set forth in claim 4, wherein the magnetic alloy is GdDyFe, GdTbFe, GdTbDyFe, NdGdTbFe, NdGdDyFe or NdGdTbDyFe.

6. A recording element as set forth in claim 1, wherein the perpendicular magnetization film has a thickness of 300 to 1000 Å and the silicon nitride dielectric layer has a thickness of 600 to 800 Å.

7. A recording element as set forth in claim 1, wherein a non-magnetic protecting layer is formed on the perpendicular magnetization film.

8. A recording element as set forth in claim 7, wherein the non-magnetic protecting layer is composed of at least one member selected from the group consisting of anti-corrosive metals such as Ti, Cr, Zr, Ta and Al, nitrides of Si, Al and Ti, carbides of Si, Cd and Ti, sulfides of Zn and Cd, fluorides of Mg and oxides of Al, Ce, Zr, Si, Cd and Bi.

9. A recording element as set forth in claim 7, wherein a covering resin layer is formed on the non-magnetic protecting layer.

10. A recording element as set forth in claim 9, wherein the covering resin layer is composed of an epoxy resin, a polyester resin, an acrylic resin or an acrylic urethane resin.

11. A magneto-optical recording element comprising a dielectric layer and an amorphous perpendicular magnetization film on a substrate, wherein the perpendicular magnetization film is a perpendicular magnetization film comprising at least Gd element as the rare earth metal element and Fe metal as the transition metal component, in which the Fe sub-lattice moments are dominant, the dielectric layer is a dielectric layer composed of amorphous silicon nitride, the perpendicular magnetization film has a magnetization Ms and a coercive force Hc such that the magnetization Ms is within a range represented by the following formula:

$$20 \text{ emu/cc} \leq Ms \leq 70 \text{ emu/cc}$$

and that the product of the magnetization Ms and the coercive force Hc is within a range represented by the following formula:

$$100 \text{ emu·KOe/cc} \leq Ms·Hc \leq 500 \text{ emu·KOe/cc}$$

and wherein the silicon nitride dielectric layer has a compression stress of $5 \times 10^9$ to $10 \times 10^9$ dyne/cm$^2$.

12. A magneto-optical recording element comprising a dielectric layer and an amorphous perpendicular magnetization film on a substrate, wherein the perpendicular magnetization film is a perpendicular magnetization film comprising at least Gd element as the rare earth metal element and Fe metal as the transition metal component, in which the Fe sub-lattice moments are dominant, the dielectric layer is a dielectric layer composed of amorphous silicon nitride, the perpendicular magnetization film has a magnetization Ms and a coercive force Hc such that the magnetization Ms is within a range represented by the following formula:

$$20 \text{ emu/cc} \leq Ms \leq 70 \text{ emu/cc}$$

and that the product of the magnetization Ms and the coercive force Hc is within a range represented by the following formula:
ti $100 \text{ emu·KOe/cc} \leq Ms·Hc \leq 500 \text{ emu·KOe/cc}$ and wherein the perpendicular magnetization film has a composition represented by the following formula:

$$(Gd_y Dy_{1-y})_x Fe_{1-x}$$

wherein Y is a number of from 0.30 to 0.95 and x is a number of from 0.17 to 0.25.

* * * * *